United States Patent

Ozawa et al.

Patent Number: 5,579,495
Date of Patent: Nov. 26, 1996

[54] INFORMATION PROCESSING IN WHICH A SIMULATION OF PARALLELISM IS ACHIEVED

[75] Inventors: Kunitaka Ozawa, Isehara; Tsuneaki Kadosawa, Ninomiyamachi; Takashi Nakamura, Hiratsuka; Eiji Koga, Hadano; Hitoshi Watanabe, Yokohama, all of Japan

[73] Assignee: Canon Kabushiki Kaisha, Tokyo, Japan

[21] Appl. No.: 411,406

[22] Filed: Mar. 28, 1995

Related U.S. Application Data

[63] Continuation of Ser. No. 769,799, Oct. 2, 1991, abandoned.

[30] Foreign Application Priority Data

Oct. 8, 1990 [JP] Japan .................... 2-271219

[51] Int. Cl.⁶ .................... G06F 9/40
[52] U.S. Cl. .................... 395/383; 395/800; 395/690; 364/231.6; 364/262.4; 364/281.3; 364/DIG. 1
[58] Field of Search .................... 395/800, 775, 395/700, 650, 425, 375, 438, 486, 421.03, 421.07; 364/130–134

[56] References Cited

U.S. PATENT DOCUMENTS

| | | | |
|---|---|---|---|
| 4,606,001 | 8/1986 | Rieben et al. | 364/167 |
| 4,847,751 | 7/1989 | Nakade et al. | 395/650 |
| 4,908,750 | 3/1990 | Jablow | 395/650 |
| 4,951,193 | 8/1990 | Muramatsu et al. | 395/650 |
| 5,115,513 | 5/1992 | Nemirovsky et al. | 395/800 |
| 5,148,542 | 9/1992 | Sakuma et al. | 395/700 |
| 5,168,566 | 12/1992 | Kuki et al. | 395/650 |
| 5,418,919 | 5/1995 | Kadosawa et al. | 395/375 |

FOREIGN PATENT DOCUMENTS 0113516  7/1984  European Pat. Off. .

OTHER PUBLICATIONS

"An Architecture For Real–Time Software Systems", IEEE Software, Baker et al., vol. 3, No. 3, May 1986, pp. 50–58.

*Primary Examiner*—Alpesh M. Shah
*Attorney, Agent, or Firm*—Fitzpatrick, Cella, Harper & Scinto

[57] ABSTRACT

An information processing system having a memory for storing a plurality of programs executed in a parallel processing manner, an instruction interpretation section for interpreting instructions in the programs, and an instruction execution section for executing the interpreted instructions. Queues for registering the numbers of the steps of the programs to be executed, wherein the numbers of the steps to be executed next are registered in the queues, the number of each step registered in the queues is read out, the processing to be performed in accordance with the step corresponding to the step number read out is interpreted, and instructions are given to the instruction interpretation section according to the content of the step interpreted. The step numbers of other steps to be executed are registered in the queues, and the plurality of programs are executed in parallel based on the order of the queues.

8 Claims, 4 Drawing Sheets

INFORMATION PROCESSING IN WHICH A SIMULATION OF PARALLELISM IS ACHIEVED

This application is a continuation of application Ser. No. 07/769,799, filed Oct. 2, 1991, now abandoned.

BACKGROUND OF THE INVENTION

1. Field of the Invention

This invention relates to an information processing system in which instructions stored in a memory are successively read out to execute instructed processing and, more particularly, to an information processing system for executing a plurality of programs virtually in parallel.

2. Description of the Prior Art

A plurality of programs can be executed with one CPU in a virtually parallel manner by changing the CPU at certain time intervals (not always constant) to successively execute the programs little by little. Determining the procedure of changing the CPU for this purpose is called scheduling, and a program for scheduling the CPU is called a monitor. There are conventional CPU scheduling methods:

a) one in which programs are executed in order of arrival of execution requests at the monitor irrespective of the kind and size of the programs, and in which the CPU is not changed over until one program is completed (FCFS method);

b) one in which if during execution of a program the monitor receives a request for execution of another program which can be executed in a shorter length of time in comparison with the program presently being executed, the program of the shorter execution time being executed immediately (SPT method); and c) one in which the CPU is assigned to each program for a predetermined constant length of time (quantum) irrespective of the size and the kind of the programs, and in which if the processing of one program is not completed in one quantum, it is suspended to be started again in the next cycle of the program rotation and the CPU is assigned to the next program (RR method).

The FCFS method entails a drawback such that when a program having a long processing time is executed, services to other programs are insufficient. In the case of the SPT method, it is difficult to previously know the processing time for each program, and the load on the monitor is increased by the operation of detecting the processing time. In the case of the RR method, the same problem as that of the FCFS method is encountered with respect to a long-processing-time program, if the quantum is excessively long. If the quantum is short, the CPU is frequently changed over and the overhead of the monitor is large. It is therefore necessary to optimize the quantum by considering these conditions, but it is difficult to determine an optimal quantum.

SUMMARY OF THE INVENTION

It is an object of the present invention to provide an information processing system for executing a plurality of programs virtually in parallel at an improved efficiency while limiting the overhead of the monitor.

To achieve this object, according to one aspect of the present invention, there is provided an information processing system having a memory for storing a plurality of programs, an instruction interpretation section for interpreting instructions in the programs, and an instruction execution section for executing the result of interpretation, the system comprising queues for registering the numbers of the steps of the programs to be executed, means for registering in the queues the numbers of the steps to be executed, means for reading out the number of each step registered in the queues, means for interpreting the processing to be performed in accordance with the step corresponding to the step number read out, and means for instructing the instruction interpretation section according to the content of the step interpreted, the step numbers of the steps to be executed being registered in the queues, the plurality of programs being executed in parallel in order of the queues.

In the information processing system having a memory for storing a plurality of programs and data, an interpretation section for interpreting instructions of the programs and an execution section for executing the result of interpretation in accordance with the present invention, processing is conducted based on the steps of registering numbers of a plurality of steps to be executed, reading out the numbers of the steps registered, interpreting from the read step numbers the processing of the corresponding steps to be performed, and providing the numbers of the registered steps to be interpreted next according to the interpreted content.

According to another aspect of the present invention, there is provided an information processing system having a memory for storing a plurality of programs, an instruction interpretation section for interpreting instructions in the programs, and an instruction execution section for executing the result of interpretation, the system comprising storage means for storing a number of a step of each of the plurality of programs which is to be executed next, means for reading out the number of the step to be executed next, and for interpreting processing in accordance with the step read out, and means for instructing the instruction interpretation section in accordance with the interpreted content, wherein the numbers of the steps to be executed are stored in the storage means and processing is performed in order of the step numbers.

According to still another aspect of the present invention, there is provided an information processing system comprising a storage section for storing a number of a step of each of the plurality of independent programs which is to be executed next, a storage control section for storing in the storage section the numbers of the steps to be executed next in the plurality of independent programs, a read control section for reading the numbers of the steps stored in the storage section and to be executed next in the plurality of independent programs, an instruction interpretation section for interpreting instructions in each of the plurality of independent programs sent from the read control section, and an instruction execution section for executing the contents of instructions interpreted.

According to a further aspect of the present invention, there is provided a method of processing information with an information processing system having a memory for storing a plurality of programs and data, an interpretation section for interpreting instructions of the programs and an execution section for executing the result of interpretation, the method comprising the steps of registering numbers of a plurality of steps to be executed, reading out the numbers of the steps registered, interpreting from the read step numbers the processing of the corresponding steps to be performed, and providing the numbers of the registered steps to be interpreted next according to the interpreted content.

DESCRIPTION OF THE PREFERRED EMBODIMENT

An embodiment of the present invention will be described below with reference to the accompanying drawings.

Figure 1:
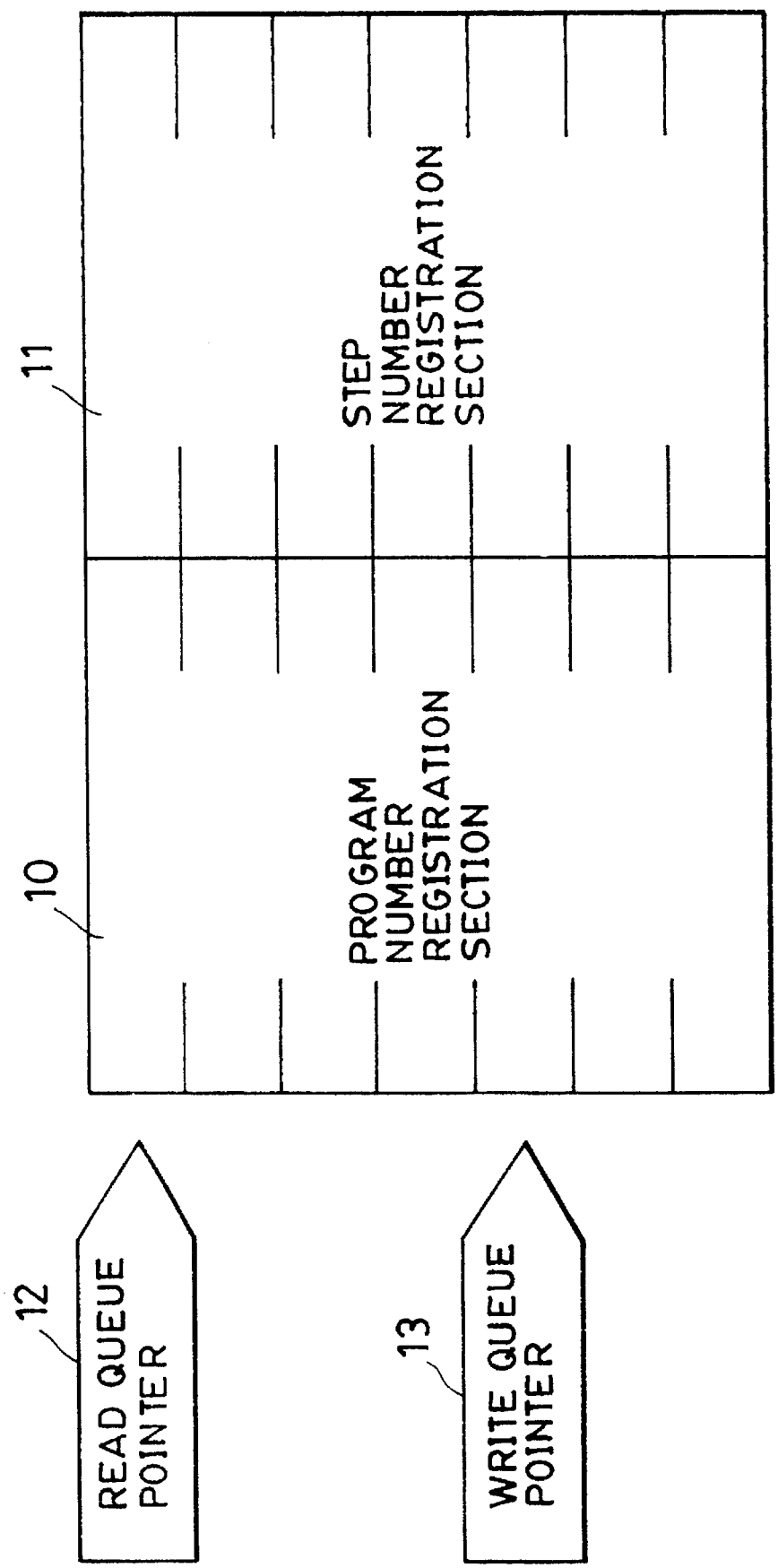
FIG. 1 is a diagram of execution wait queues for determining the CPU scheduling of a virtual parallel processing system in accordance with the present invention.

FIG. 1 is a diagram of execution wait queues for determining scheduling of a CPU of a virtual parallel processing system in accordance with the present invention. Each of programs executed by this system is expressed as a set of the steps which are minimum division units of processing. In a program number registration section 10, program numbers of steps in a wait state at a certain time are registered. In a step number registration section 11, step numbers of the steps in the wait state at the corresponding time are registered. A read queue pointer 12 indicates a step executed at the corresponding time. A write queue pointer 13 indicates the place of a step number to be registered next.

Figure 2:
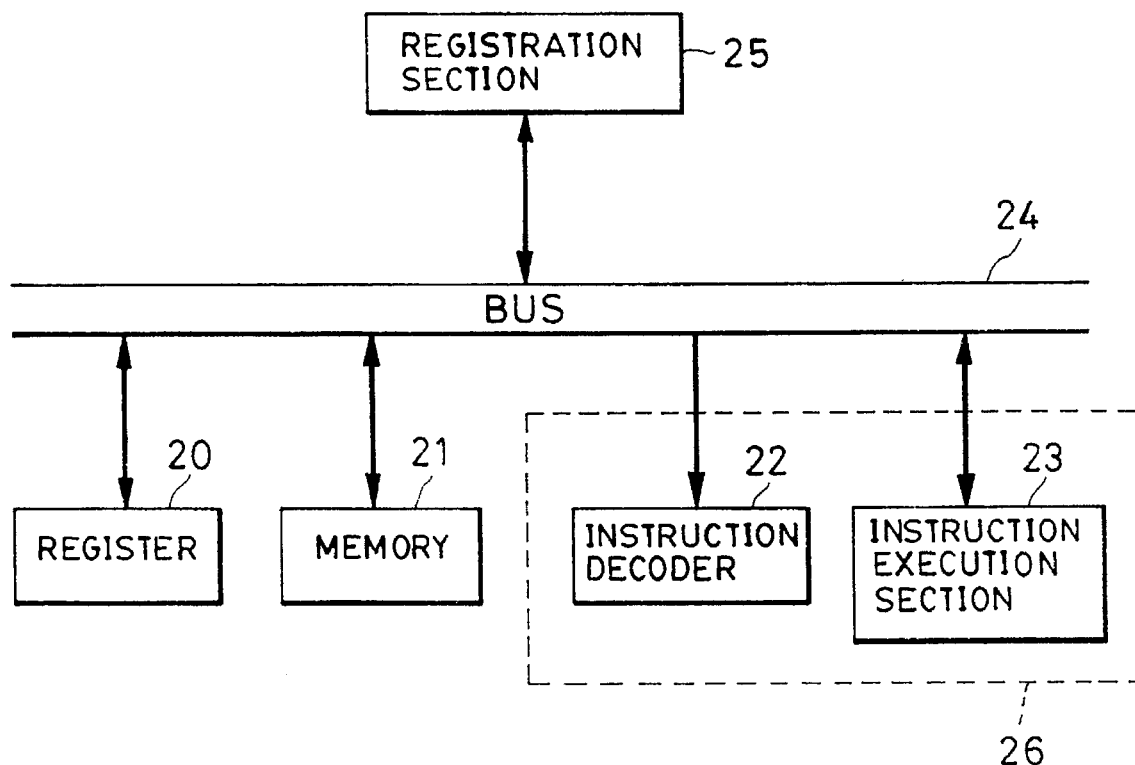
FIG. 2 is a block diagram of the information processing apparatus.

FIG. 2 is a block diagram of the virtual parallel processing system in accordance with the present invention. The system has a register 20 in which data or the result of calculation is temporarily stored, and a memory 21 in which programs or data are stored. The programs include user programs such as those shown in FIG. 5(a) and a monitor such as that shown in FIG. 4. Each program stored in the memory 21 is sent to an instruction decoder 22 through a bus 24 to be interpreted. The result of interpretation is sent to an instruction execution section 23 to execute the program. A block 25 corresponds to the registration section shown in FIG. 1. A CPU 26 has a decoder 22 and an execution section 23. Each step being provided in the form shown in FIG. 3. In the process of the monitor, an OP code section 30 of each of step is referred to and the kinds of instructions to be executed are discriminated. Information on details of the instructions to be executed is obtained by referring to an operand section 31, operations to be performed by the CPU are determined along with the kinds of the instructions to be executed, and a corresponding instruction set is given to the CPU. After the CPU has completed the execution of the given instruction set, the number of the step to be executed next is obtained by referring to a termination section 32 of the step. On the other hand, the step numbers of steps in the execution wait state are registered in the execution wait queues in the registration section 11 shown in FIG. 1. The read queue pointer 12 indicates a step which is being executed. The read queue pointer 12 is incremented by 1 when the execution of this step is completed. The numbers of the programs to which the steps registered in the execution wait queues pertain are registered in the program number registration section 10, while the numbers of the steps registered in the execution wait queues are registered in the step number registration section 11. The monitor can therefore recognize the step to be executed and the program to which the step pertains by referring to both the program number registration section 10 and the step number registration section 11 at the position of the execution wait queue indicated by the read queue pointer 12.

Figure 4:
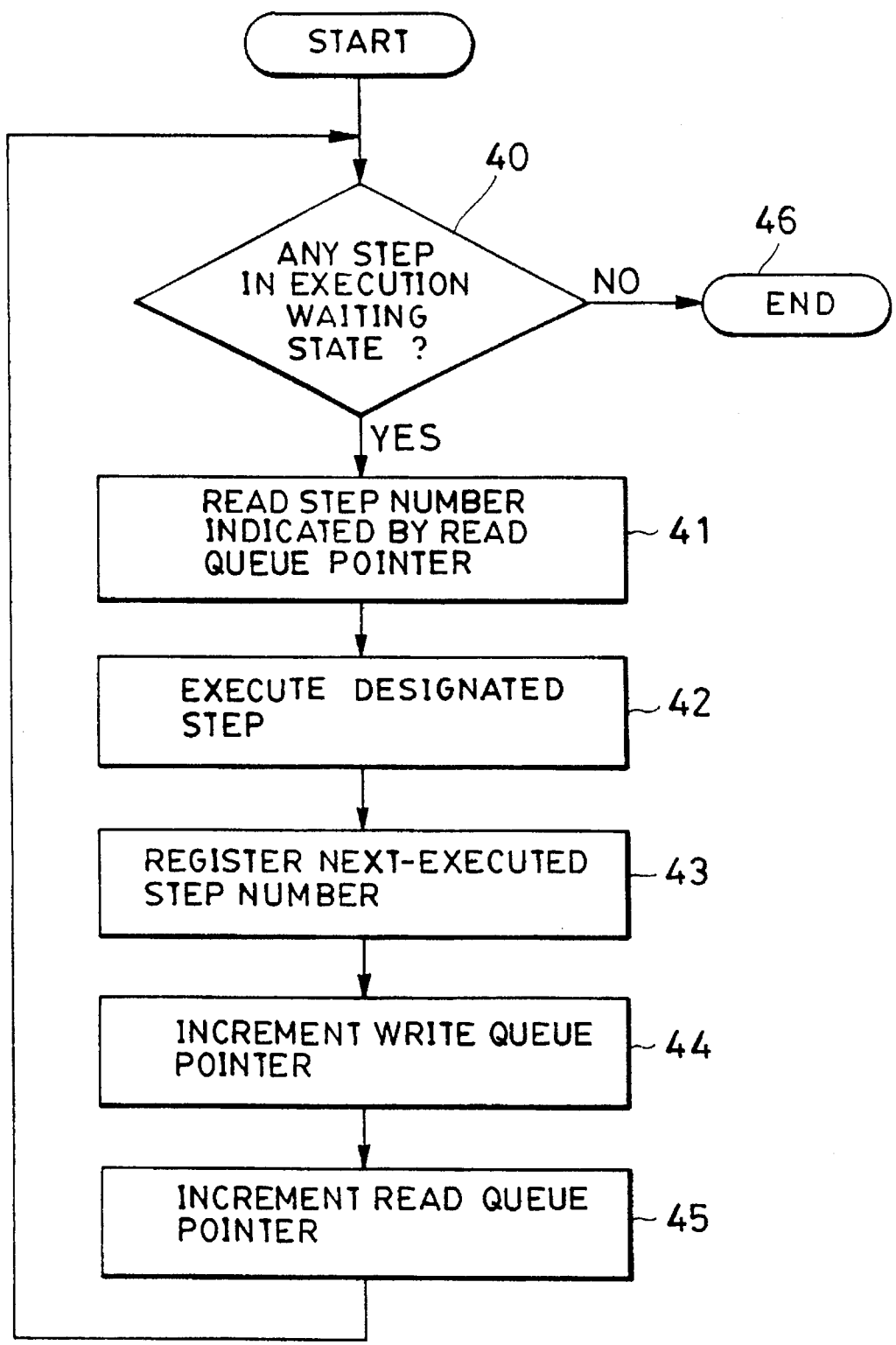
FIG. 4 is a flow chart of a process of virtual parallel processing.

The above-described operations will be described below with reference to FIG. 4 showing a flow chart of virtual parallel processing. It is assumed here that a step has already been registered in one execution wait queue (in a state where the positions indicated by the read queue pointer 12 and the write queue pointer 13 do not coincide with each other).

In step 40, the CPU 26 checks whether there is any step in the execution wait state.

If there is a step in the execution wait state, the CPU 26 refers to, in step 41, the program number and the step number registered at the position indicated by the read queue pointer 12.

In step 42, the CPU 26 executes the step designated by the CPU 26.

When the execution of the step is completed, the CPU refers to the termination section 32 of the executed step, finds the step number of the step to be executed subsequently to the present step in the corresponding program, and writes the step number at the position indicated by the write queue pointer 13.

In step 44, the CPU increments the write queue pointer 13 by 1. If at this time the write queue pointer 13 exceeds the end stage of the execution wait queues, the top address of the execution wait queues is substituted in the write queue pointer 13 so that the write queue pointer 13 is returned to the top execution wait queue.

In step 45, the CPU increments the read queue pointer 12 by 1. If at this time the read queue pointer 12 exceeds the end stage of the execution wait queues, the top address of the execution wait queues is substituted in the read queue pointer 12 so that the read queue pointer 12 is returned to the top execution wait queue.

The process returns to step 40, and the CPU checks whether or not there is any step in the execution wait state. If there is a step in the execution wait state, the above-described procedure is repeated. If there is no step in the execution wait state, the process is terminated in step 46.

Figure 5A:
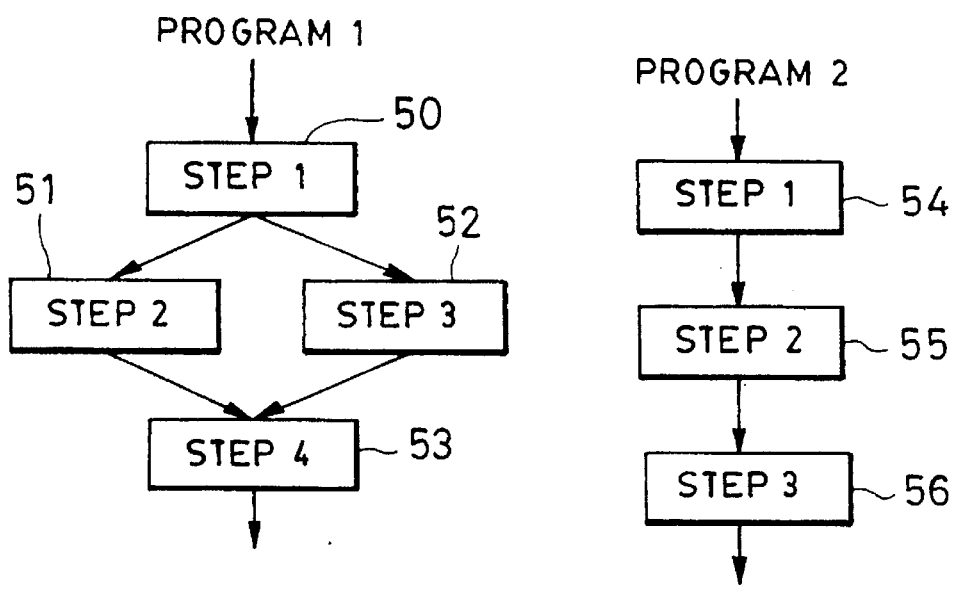
FIGS. 5(a) and 5(b) are a program block diagram and a diagram of samples of execution wait queues.
Figure 5B:
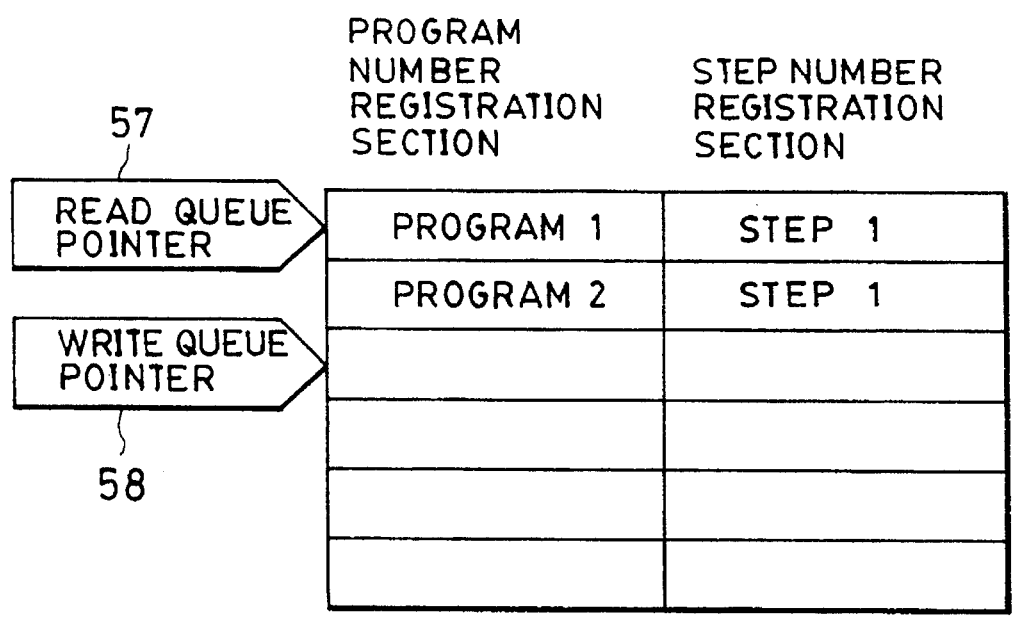

The process will be further described with respect to examples of the programs and queues shown in FIGS. 5(a) and 5(b).

It is assumed here that programs 1 and 2 shown in FIG. 5(a) are in a state of being executed in parallel, a program 1 step 1 and a program 2 step 1 are registered in the execution wait queues of the registration section, and a read queue pointer 57 indicates the program 1 step 1, as shown in FIG. 5(b). It is also assumed that a program 1 step 2 (51) and a program 1 step 3 (52) shown in FIG. 1 are executed in parallel with each other.

First, the place indicated by the read queue pointer 57 is referred to and it is thereby recognized that the step to be executed in step 1 by the CPU is the program 1 step 1 (50). The OP code section and the operand section of the program 1 step 1 are read out and a corresponding instruction set is given to the CPU (not shown). When the CPU (not shown) has completed the execution of the given instruction set, the termination section (not shown) of the program 1 step 1 (50) is read out to find the step to be executed subsequently to the step 1 (50) in the program 1. Since information is written in the termination section of the program 1 step 1 (50) to indicate that the program 1 step 2 (51) and the program 1 step 3 (52) are steps to be executed next, the program number and the step number of the program 1 step 2 (51) are written in the place of the execution wait queue indicated by a write queue pointer 58 in FIG. 5(b). The write queue pointer 58 is then incremented by 1. If the write queue pointer 58 exceeds the end stage of the execution wait queues, the top address of the execution wait queues is substituted in the write queue pointer 58 so that the write queue pointer 58 is returned to the top execution wait queue. Since in this case there is another step to be executed, the monitor writes the program number and the step number of the program 1 step 3 (52) of the place of the execution wait queue indicated by the write queue pointer 58 in FIG. 5(b), and increments the write queue pointer 58 by 1. The monitor then increments the read queue pointer 57 by 1, since the execution of the program number 1 step 1 (50) has been completed. If the read queue pointer 57 exceeds the end stage of the execution wait queues, the top address of the execution wait queues is substituted in the read queue pointer 57 so that the read queue pointer 57 is returned to the top execution wait queue. The process then proceeds to execute the next step. The read queue pointer 57 presently indicates the program 2 step 1, and, by reference to the execution queue of FIG. 5(b), it is recognized that the program 2 step 1 (54) is to be executed, the OP code section and the operand section of the program 1 step 2 (54) are read out, and a corresponding instruction set is given to the CPU. When the CPU completes the instructed operation, the termination section of the program 2 step 1 (54) is read out and the program number and the step number of the step to be executed subsequently to the step 1 in the program 2 (program 2 step 2 in this case) are written at the position indicated by the write queue pointer 58. Then the write queue pointer 58 and the read queue pointer 57 are respectively incremented by 1. If a queue pointer exceeds the end stage of the execution wait queues, the top address of the execution wait queues is substituted so that the queue pointer is returned to the top execution wait queue. Next, since the read queue pointer 57 is indicating the program 1 step 2 (51), the execution of the program 1 step 2 (51) is started. Subsequently, the same procedure is repeated until the execution queues shown in FIG. 5(b) become empty.

Figure 3:
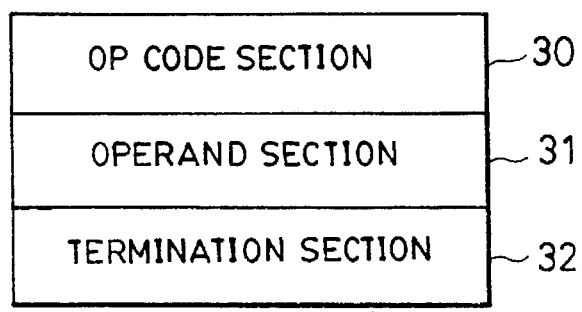
FIG. 3 is a diagram of the form of instructions executed by the information processing system.

In the above-described embodiment, the programs are formed of steps which are minimum division units of processing. However, this is not essential to the present invention, and the present invention can easily be applied to programs having a hierarchic structure such that a set of steps constitutes a sub program and a set of sub programs constitutes a program. The above-described embodiment has an interpreter form such that steps having a structure such as that shown in FIG. 3 are interpreted and executed by a monitor, but this also is not essential to the present invention. Even in the case of a compiler form such as programs expressed by codes which can be directly interpreted by the CPU, it is easy to register, in an execution wait queue, a step to be executed subsequently to a certain step when this preceding step is executed, which effect is realized by inserting in each step information on the step to be executed subsequently. Also, a plurality of execution wait queues may be provided with respect to priority order, and the arrangement may be such that when an execution wait queue with higher priority becomes empty, a step registered in the queue of the next priority rank is executed, thereby making it easy to control a system in which a plurality of programs differing in priority coexist.

Thus, each program is formed of steps defined as minimum execution units, the numbers of steps to be executed are registered in queues, and the CPU is changed over according to the queues, thereby efficiently executing parallel processing in a plurality of programs or one program in a virtual parallel manner. The possibility of insufficiency of services to a particular program is thereby reduced, and the overhead of the monitor is reduced since the CPU is changed over in an optimal quantum. Also, each queue has a simple structure formed of a program number registration section and a step number registration section, and registration in each queue and reading of the content of each queue are therefore easy and the load on the monitor is reduced.

While the present invention has been described with respect to what presently are considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing system having a memory for storing a plurality of programs, each program consisting of a plurality of numbered steps and each step including a respective instruction, said system further having an instruction interpretation section for interpreting the instructions in the programs and an instruction execution section for executing interpreted instructions interpreted by said instruction interpretation section, said system comprising:

storage means for storing in sequence a number of a step in each of said programs to be executed next within the respective program, said storage means comprising a plurality of memory-locations which concurrently store the numbers of respective ones of the steps;

reading means for reading, from the storage means, the number next in sequence;

means for providing the instruction of the step whose number was read out to said instruction interpretation section and for providing the corresponding interpreted instruction to said instruction execution section for execution, a number of a further step to be executed next within the program including the step whose number was read out being determined in accordance with the corresponding interpreted instruction;

writing means for writing the further-step number into sequence in different respective memory-locations of the storage means after execution of the corresponding interpreted instruction, said reading means then reading a further step number next in sequence after operation of said writing means: and means for indicating to said storage means a position in the sequence at which each step to be executed next is stored, and means for indicating to said storage means a position from which each step to be executed is read out.

2. An information processing system according to claim 1, wherein said storage means includes a storage member having a storage capacity for storing the steps to be executed next.

3. An information processing system according to claim 1, wherein said storage means has an area for storing each step to be executed next and a name of the corresponding program.

4. An information processing system according to claim 1, further comprising means for determining whether or not any step to be executed next is stored in said storage means.

5. An information processing system having a memory for storing a plurality of programs, each program consisting of a plurality of numbered steps and each step including a respective instruction, said system comprising:

a storage section for storing in sequence a number of a step in each of said programs to be executed next within the respective program, said storage section comprising a plurality of memory-locations for storing the numbers of the plurality of steps;

a storage control section for controlling storage in different respective memory-locations of said storage section of the numbers of the steps to be executed next respectively in the respective programs;

a read control section for reading, from the storage section, the numbers of the steps to be executed next in sequence;

an instruction interpretation section for interpreting instructions in each of the programs corresponding to the steps whose numbers are read by said read control section;

an instruction execution section for executing interpreted instructions interpreted by said instruction interpretation section; and a pointer for indicating to said storage section a position in the sequence at which each step to be executed next is stored, and another pointer for indicating to said storage section a position from which each step to be executed is read out.

6. An information processing system according to claim 5, wherein said storage section includes a storage member having a storage capacity for storing the steps to be executed next.

7. An information processing system according to claim 5, wherein said storage section has an area for storing each step to be executed next and a name of the corresponding program.

8. An information processing system according to claim 5, further comprising means for determining whether or not any step to be executed next is stored in said storage section.

* * * * *